United States Patent [19]
Notestine

[11] 3,918,740
[45] Nov. 11, 1975

[54] ROLL BAR STRUCTURE FOR VEHICLES

[76] Inventor: Richard L. Notestine, 6654 S. E. Flavel, Portland, Oreg. 97206

[22] Filed: Feb. 25, 1974

[21] Appl. No.: 445,646

Related U.S. Application Data

[63] Continuation of Ser. No. 276,783, July 31, 1972, abandoned.

[52] U.S. Cl. .............................. 280/150 C; 296/102
[51] Int. Cl. ...................... B60r 27/00; B60r 21/02
[58] Field of Search ........ 280/150 C; 296/102, 28 C

[56] References Cited
UNITED STATES PATENTS

| 1,200,655 | 10/1916 | Scheidemantel | 280/150 C |
| 3,524,674 | 8/1970 | Medeiros | 280/150 C |
| 3,622,177 | 11/1971 | Notestine | 280/150 C |
| 3,713,688 | 1/1973 | Monroe | 280/150 C |

FOREIGN PATENTS OR APPLICATIONS

| 38,203 | 4/1965 | Germany | 296/102 |
| 265,039 | 12/1967 | Austria | 296/102 |
| 95,988 | 11/1958 | Norway | 296/102 |
| 622,899 | 10/1926 | France | 280/150 C |

Primary Examiner—Kenneth H. Betts
Assistant Examiner—Jack D. Rubenstein
Attorney, Agent, or Firm—Eugene M. Eckelman

[57] ABSTRACT

A roll bar structure having forward and rearward inverted U-shaped frame members secured together by side longitudinal frame members located between the upper and lower ends thereof. The frame members are shaped to assume substantially the contour of the inner surface of the vehicle side walls, and have base plates arranged for securement to the floor of the vehicle. These base plates are attached to the floor at points forward and rearward of wheel coverings which project upwardly inside the vehicle.

1 Claim, 3 Drawing Figures

ROLL BAR STRUCTURE FOR VEHICLES

This is a continuation of application Ser. No. 276,783, filed July 31, 1972, now abandoned.

BACKGROUND OF THE INVENTION

This invention relates to new and useful improvements in roll bar structures for vehicles.

Certain sport vehicles are now popular which have a rear compartment and a hard top portion capable of being removed for providing a convertible or open type vehicle. With the top removed, however, the occupants have very little protection in case the vehicle should roll over. In fact, this type of vehicle does not provide satisfactory protection for its occupants even when the top is in place due to the attachable nature of the top portion and its tendency to be more fragile than a regular vehicle top. Further, such type of vehicle generally has four wheel drive and is driven frequently into rough terrain where it is more likely to be rolled over than the average vehicle.

In my prior U.S. Patent No. 3,622,177, I have provided a roll bar cage for a jeep type vehicle wherein there is employed a single roll bar in the rearward portion of the vehicle. In this patent a roll bar is also illustrated in connection with the front of the driver's compartment, namely, at the windshield portion of the vehicle. The structure shown in my former patent is not adapted for use with a sport type vehicle having a rear compartment since greater protection than such structure affords is necessary at the rear portion of the vehicle.

SUMMARY OF THE INVENTION

According to the present invention and forming a primary objective thereof, a roll bar structure is provided for vehicles of the type which require protection at a rearward compartment of the vehicle, such as for example a vehicle which employs a removable top and a rear seat.

A more particular object of the present invention is to provide a roll bar structure of the type described which employs a pair of U-shaped frame members secured together by side longitudinal frame members and disposed one at the front of the rear compartment and one at the rear of the compartment, said frame members having a shape approximating that of the contour of the interior of the vehicle and also having base plates arranged for securement to the floor of the vehicle.

Still another object of the invention is to provide a roll bar structure of the type described which is readily secured to a vehicle without any substantial altering of the vehicle.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 1:
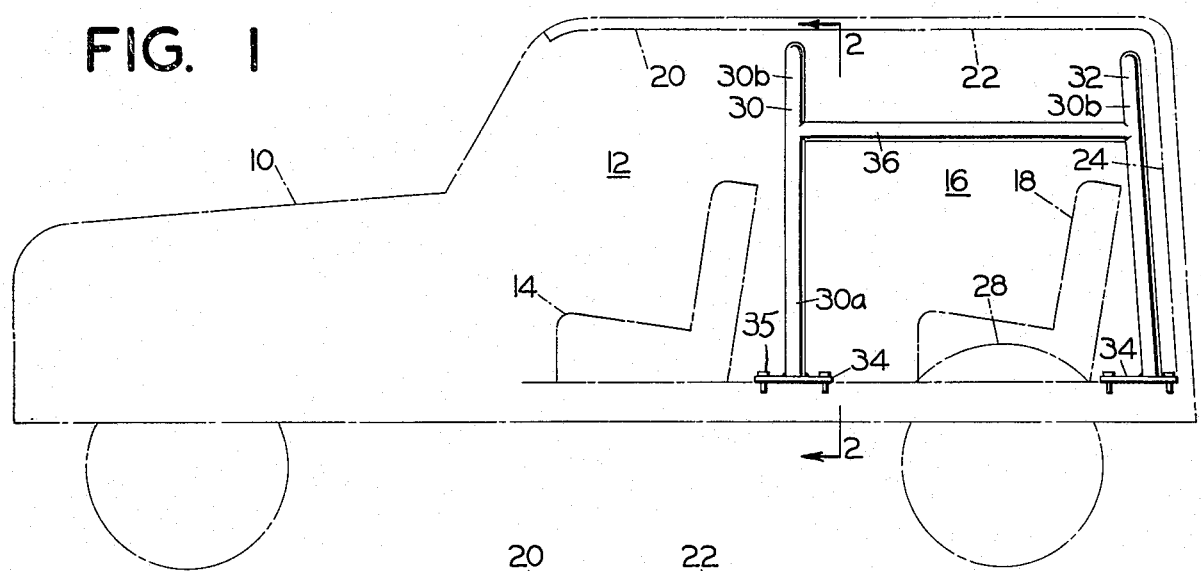
FIG. 1 is a side elevational view of a roll bar structure of the present invention shown in combination with a vehicle, the vehicle being shown in phantom lines.
Figure 2:
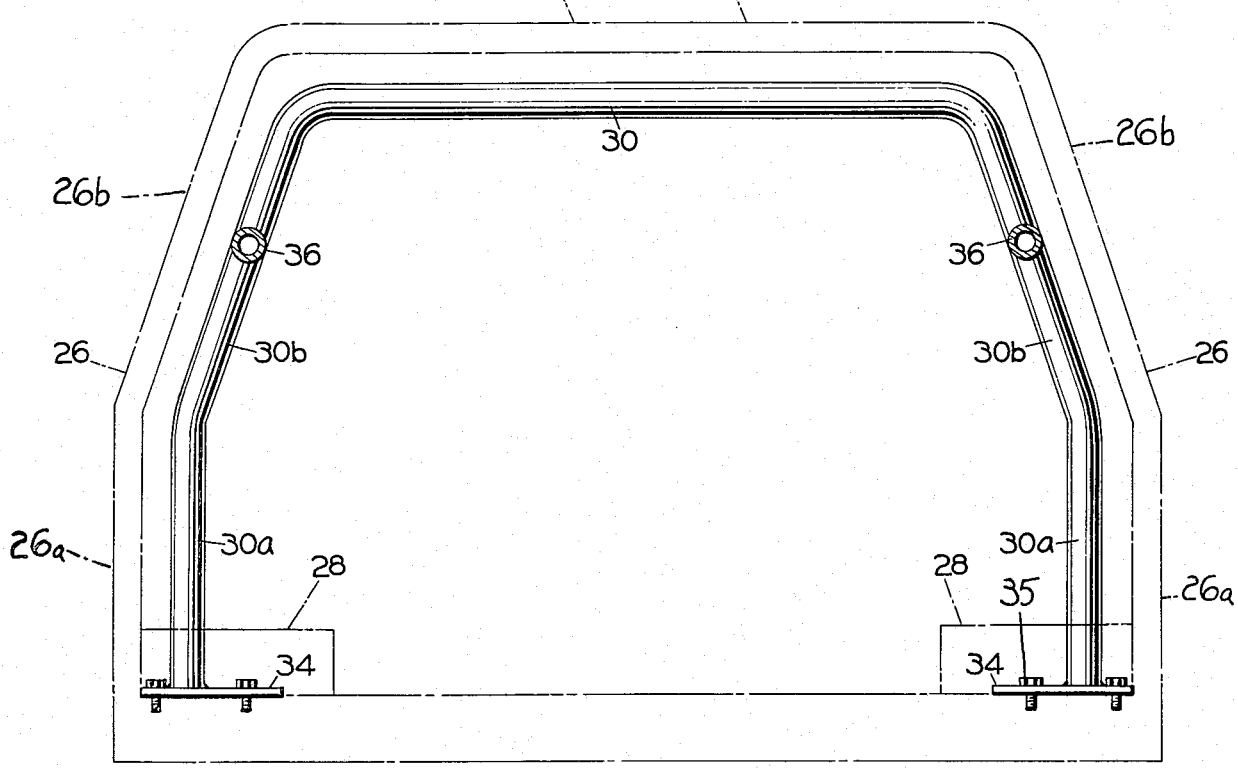
FIG. 2 is an enlarged vertical sectional view taken on the line 2—2 of FIG. 1, this figure also showing the vehicle in phantom lines.

Referring first to FIGS. 1 and 2, the roll bar structure of the invention is intended for use primarily with a vehicle 10 of the type shown, having a forward driver's compartment 12 provided with seats 14 and a rear compartment 16 which may or may not have seats 18. A rearward portion 20 of the top of the vehicle is removable to provide a convertible-type or open air vehicle. The removable portion usually is of one-piece, comprising a top wall 22, a rear wall 24, and side walls 26.

Wheel coverings 28 generally extend upwardly into the compartment 16.

As stated above, the occupants do not have sufficient protection in the event of a roll over even though the top is in place, and it is the intent of the present roll bar structure to provide such protection. It comprises front and rear U-shaped frame members 30 and 32, respectively, having base plates or foot members 34 arranged to be secured to the floor of the vehicle, as by bolts 35. The provision of bolt holes in the floor of the vehicle to receive the bolts 35 comprises the only alteration of the vehicle necessary.

The two U-shaped frame members 30 and 32 are connected together in a rigid structure by longitudinally extending side bars 36, one on each side thereof and secured downwardly from the upper end. The longitudinal spacing of the front and rear frames 30 and 32 is such that the base plates 34 thereon are located forwardly and rearwardly, of the wheel coverings 28.

With particular reference to FIG. 2, the U-shaped frame members 30 and 32, which are of identical structure, assume the contour at their sides substantially identical to the contour of the side walls 26 of the vehicle. Generally, the sides of the vehicle have a substantially vertical lower wall portion 26a and an inwardly inclined upper portion 26b. To fit such a vehicle, the U-shaped frames have a similar shape, comprising a substantially vertical lower portion 30a and an inwardly inclined upper portion 30b. Such structure, similar to the angled side wall structure of the vehicle, adds strength. Also, with reference to FIG. 1, the rear wall 24 of the vehicle may incline forwardly and preferably the rear U-shaped frame member 32 similarly inclines forwardly. Such angled disposition of the parts adds further structural strength. In a preferred arrangement, the side bars are secured to the U-shaped frame members a short distance down from the top. The similar shape of the members 30 and 32 relative to the contour of the vehicle side walls provides for minimum consumption of space by the roll bar structure within the vehicle. Also, the reinforcing bars 36 being at the sides do not interfere with the upper open portion of the vehicle when the top is off. Furthermore, since the members 30 and 32 are close to the side walls, such members cooperate with the vehicle structure to form a high strength structure in the event of a roll over.

Figure 3:
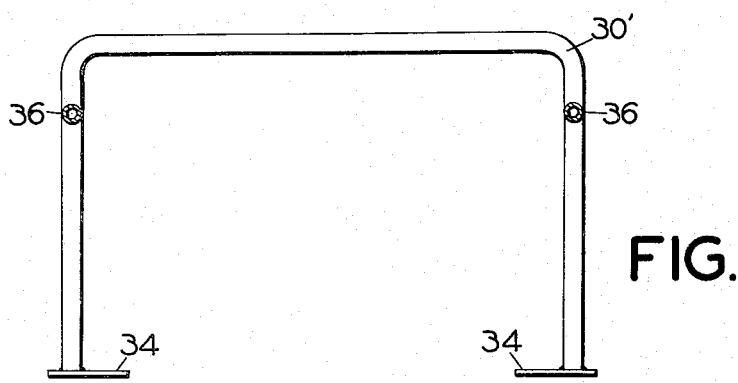
FIG. 3 is an end view of a roll bar structure of a slightly different shape than that shown in FIG. 2.

FIG. 3 shows a U-shaped roll bar frame member 30' of slightly different shape than that shown in FIG. 2. This embodiment uses straight leg portions extending substantially down at right angles from the top connecting portion. Similar to FIG. 2, it also uses base plates 34, a rear U-shaped frame member, not shown, and connecting side bars 36. The configuration is preselected to conform to the side wall contours of a different make of vehicle, namely, to one which has a side wall contour that extends down substantially vertically from the top. Any other shape of leg may be provided as necessary.

According to the present invention, the roll bar structure of the invention is useful on those types of vehicle which require protection at the rearward portion thereof in the event of a roll over. The present roll bar structure has the advantage that it does not materially interfere with use of the vehicle and furthermore can be easily and economically installed with only minor alteration of the vehicle. Further yet, when the top of the vehicle is in place, the roll bar structure cooperates therewith for strength in the event of a roll over.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A combination vehicle and roll bar structure therefor comprising
   a. a front driver's compartment,
   b. a rear passenger compartment comprising a bottom wall and a body portion defined by a top wall, side walls, and a rear wall,
   c. a wheel housing projecting upwardly from and forming a part of the bottom wall on each side of said rear compartment,
   d. a pair of transverse roll bars formed of metal tubing arranged to be mounted in the rear compartment of the vehicle with one of said roll bars disposed at the front of the rear compartment and the other disposed at the rear of the rear compartment,
   e. said roll bars being of inverted U-shape, having upstanding leg portions and a connecting top portion,
   f. each of said roll bars being bent into shape from a single length of tubing,
   g. base plates on the bottom ends of said legs secured to the bottom wall of said rear compartment of the vehicle,
   h. and a pair of longitudinally extending reinforcing bars connected to said leg portions of said two roll bars on respective sides at a point intermediate the upper and lower ends of said legs to form a rigidized roll bar assembly open at the front and rear from the top connecting portion to the base plates and also open at the top to allow head room for persons seated in the rear passenger compartment,
   i. said legs of the roll bars being shaped to substantially follow the contour of the inner surface of said side walls,
   j. said base plates on each side being disposed one forwardly of the wheel housings and one rearwardly of the wheel housings.

* * * * *